(12) United States Patent
Cho et al.

(10) Patent No.: US 7,573,628 B2
(45) Date of Patent: Aug. 11, 2009

(54) ACTUATOR COMPRISING MECHANIC FILTER

(75) Inventors: Jin Woo Cho, Seongnam-si (KR); Young Chul Ko, Yongin-si (KR); Hee Moon Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 11/645,769

(22) Filed: Dec. 27, 2006

(65) Prior Publication Data

US 2007/0229932 A1  Oct. 4, 2007

(30) Foreign Application Priority Data

Mar. 29, 2006  (KR) ..................... 10-2006-0028217

(51) Int. Cl.
*G02B 26/08* (2006.01)
(52) U.S. Cl. ................................. 359/224.1; 359/202.1
(58) Field of Classification Search ............. 359/202.1, 359/212.1, 212.2, 223.1–226.1
See application file for complete search history.

(56) References Cited

U.S. PATENT DOCUMENTS

| | | | |
|---|---|---|---|
| 6,819,822 B2 | 11/2004 | Behin et al. | |
| 7,031,041 B2 * | 4/2006 | Mi et al. | 359/224.1 |
| 7,265,887 B2 * | 9/2007 | Orcutt | 359/224.1 |
| 2002/0149294 A1 | 10/2002 | Matsumoto et al. | |
| 2005/0128552 A1 | 6/2005 | Yasuda et al. | |
| 2005/0253055 A1 | 11/2005 | Sprague et al. | |

FOREIGN PATENT DOCUMENTS

| | | |
|---|---|---|
| JP | 07 027989 A | 1/1995 |
| JP | 2000-162538 A | 6/2000 |
| JP | 2002-140844 A | 5/2002 |
| JP | 2002-318358 A | 10/2002 |
| JP | 2003-262803 A | 9/2003 |
| JP | 2004-191224 A | 7/2004 |
| JP | 2005 250078 A | 9/2005 |
| KR | 10-2002-0019628 A | 3/2002 |
| KR | 10-2002-0057982 A | 7/2002 |
| KR | 10-2004-0025206 A | 3/2004 |
| KR | 10-2004-0054434 A | 6/2004 |

* cited by examiner

*Primary Examiner*—Euncha P Cherry
(74) *Attorney, Agent, or Firm*—Sughrue Mion, PLLC

(57) ABSTRACT

An actuator which is actuated by an external input and also can remove noise caused by a high frequency by providing a low pass filter capable of preventing a particular high frequency through its mechanical structure. The actuator includes an external gimbal, an internal gimbal, and a connection axis which is disposed in an identical direction to an axis extended from the external gimbal. In this intake, the connection axis is provided between the external gimbal and internal gimbal whereby a not desired high frequency vibration may not be transmitted to a vibrated body provided in the internal gimbal. The actuator constructed as above does not need an electrical control and an additional part, and can be actuated by an external input, and also is highly productive and does not require an additional cost by providing a low pass filter with only comparatively simple change of a mechanical design.

36 Claims, 12 Drawing Sheets

ACTUATOR COMPRISING MECHANIC FILTER

CROSS-REFERENCE TO RELATED PATENT APPLICATIONS

This application claims priority from Korean Patent Application No. 10-2006-0028217, filed on Mar. 29, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to an actuator which is actuated by an external input, and more particularly, to an actuator which can remove a particular high frequency component from an external input by providing a low pass filter with a simple change of a mechanical design, and also can reduce or eliminate a tremor or noise caused by a high frequency.

2. Description of Related Art

An actuator may be a driving apparatus with a motor supplied with power to produce a driving force. Also, an actuator, e.g. an optical scanner, may be actuated or vibrated by an external electromagnetic force or other physical forces.

An optical scanner is usually used to change the path of a laser, e.g. during the scanning of a two dimensional image. Such an optical scanner may further be used for a laser printer, a bar code reader, and the like. In addition, the optical scanner may perform more complicated operations such as complex image processing, e.g., for a laser television or the like. In such an environment, a laser may be provided along a certain path as a light source, so that a desired image may be obtained by two-dimensionally changing the path of the laser. A method of using two mirrors, each working with an axis respectively different from each other, has been used to change a laser's path. In addition, another method includes two-dimensionally changing the path of a laser by moving one mirror with two axes.

Figure 1:
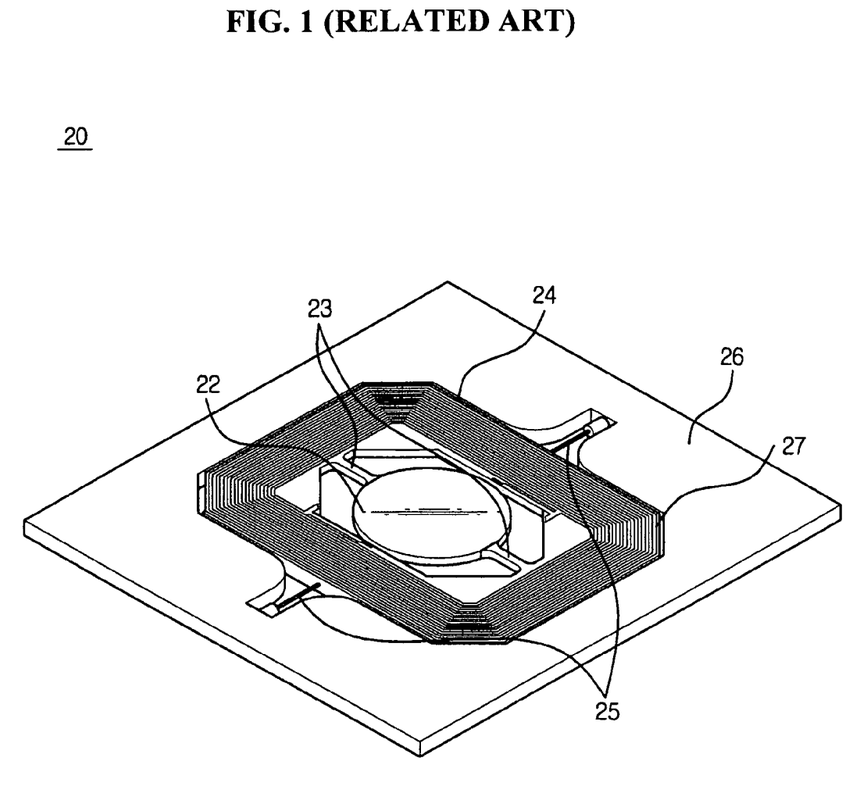
FIG. 1 is a perspective view illustrating a scanner that changes a path of light by moving one mirror with two axes according to a related art.

FIG. 1 is a perspective view illustrating a scanner changing the path of light by moving one mirror with two axes, according to a related art.

Referring to FIG. 1, a scanner 20 includes a mirror 22, a horizontal torsion axis 23, an internal frame 24, a vertical torsion axis 25 and an external frame 26. The mirror 22 is coated to be reflective at the center of the scanner 20. The horizontal torsion axis 23 is extended from the mirror 22 in opposite directions from each other. Here, the internal frame 24 is physically connected to the horizontal torsion axis 23 and is provided around the mirror 22. The vertical torsion axis 25 is extended from the internal frame 24 and perpendicular to the horizontal torsion axis 23. The external frame 26 is physically connected to the vertical torsion axis 25.

Coils 27 are provided on the internal frame 24, which is in a gimbal structure. Accordingly, when a current is supplied to the coils 27, the internal frame 24 may react to an externally formed magnetic field and produce a moment capable of driving the scanner 20. When forming the magnetic field in a tilted direction towards the horizontal torsion axis 23 and the vertical torsion axis 25, and supplying a current to the coils 27, a torque is occurred vertically with respect to the magnetic field and the current. As the occurred torque is divided into two components of the horizontal torsion axis 23 and the vertical torsion axis 25, the mirror 22 may vibrate on the horizontal torsion axis 23. Also, the internal frame 24 and the mirror 22 may vibrate due to vibration on the vertical torsion axis 25. As a result, with such dual-axial vibrations with a single mirror, image signals may be two-dimensionally distributed.

Hereinafter, a dual-axial driving of a mirror will be further described in detail. To project an image on an externally located screen utilizing the scanner 20, scanning lines may be projected on the screen by vibrating the mirror 22 on the vertical torsion axis 25, e.g. vibrating the mirror 22 in a sawtooth wave form of about 60 Hz, and vibrating the mirror 22 on the horizontal torsion axis 23 with a sine wave of about 20 kHz which is a comparatively high frequency. Namely, a high frequency vibration of the horizontal torsion axis 23 may horizontally scan a scanning line on the screen and a low frequency vibration of the vertical torsion axis 25 may vertically move the scanning line on the screen, thereby embodying a two-dimensional image on the screen.

Each moment for vertically and horizontally vibrating the mirror 22 may be provided to the mirror 22 as one synthesized moment. In this instance, such a synthesized moment has an approximate low frequency form in which a form of a high frequency signal is modulated in a low frequency signal.

It is assumed that a resonant frequency of a mass capable of vibrating on the vertical torsion axis 25 of the mirror 22 is designed to be about 1 kHz and a resonant frequency of a mass capable of vibrating on the horizontal torsion axis 23 of the mirror 22 is designed to be about 20 kHz. Under these conditions, when a current of a sawtooth wave of about 60 Hz and a current of a horizontal resonant frequency of about 20 kHz are modulated and supplied to the coils 27 of the internal frame 24, a moment is vertically generated with respect to an externally formed magnetic field. Such a moment is distributed to the horizontal torsion axis 23 and the vertical torsion axis 25, and utilized for actuating the mirror 22. In this instance, since the mirror 22 is oscillated at about 20 kHz on the horizontal torsion axis 23 by the synthesized moment, the mirror 22 does not react to a sawtooth wave component of about 60 Hz and is actuated in a sawtooth wave form of about 60 Hz on the vertical torsion axis 25.

Figure 2:
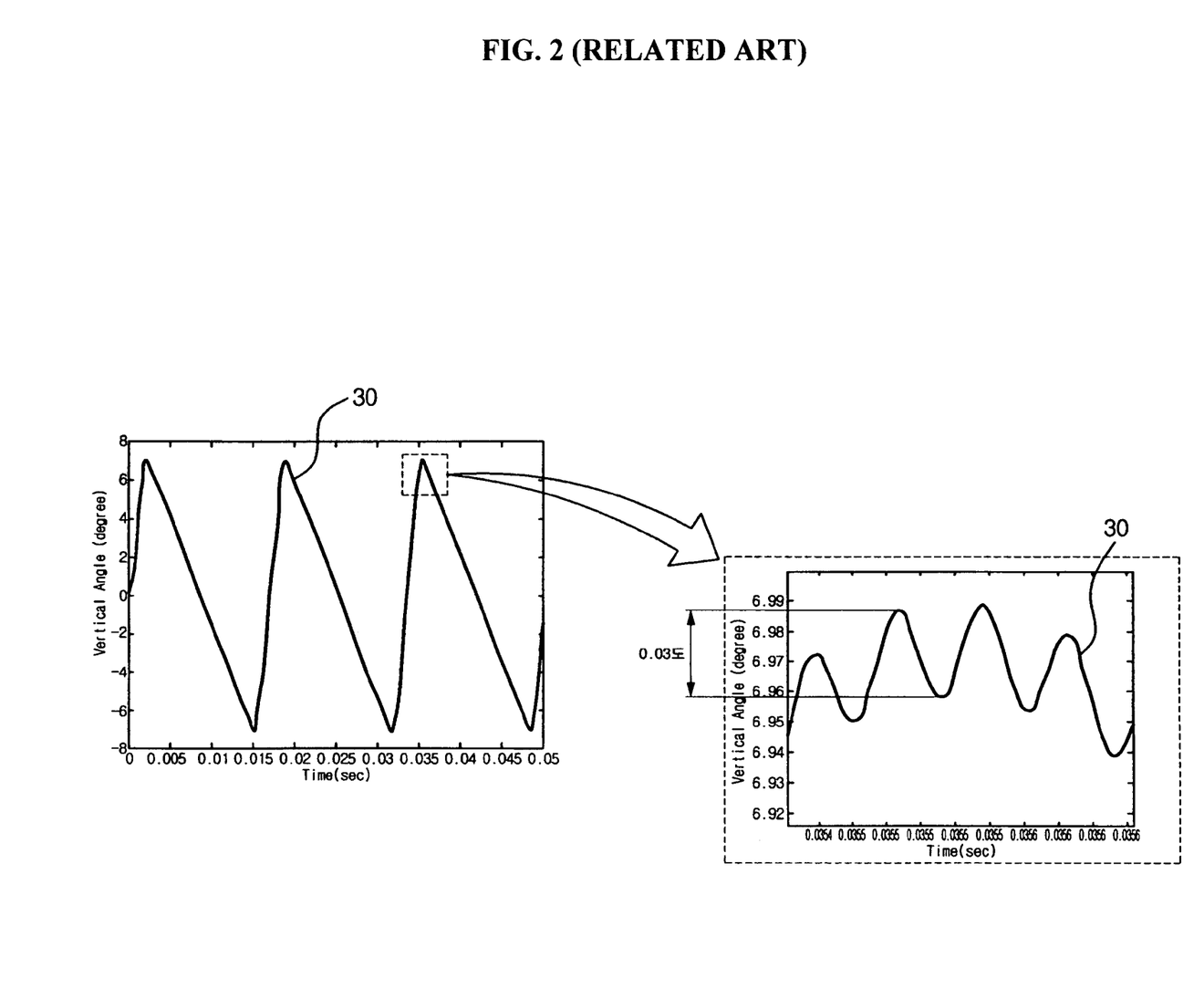
FIG. 2 illustrates movement of a vertical torsion axis according to time in a scanner of the related art.

However, such a synthesized moment working on the vertical torsion axis 25 includes a sawtooth component of about 60 Hz and also includes a sine wave component of about 20 kHz. Accordingly, when vertically scanning, a minute tremor or noise of about 20 kHz exists, as shown in FIG. 2. Namely, while each of the vertical torsion axis 25 and the horizontal torsion axis 23 must be independently vibrated by a low frequency signal, e.g. 60 Hz, and a high frequency signal, e.g. 20 kHz, respectively, the high frequency signal affects the low frequency signal of the vertical torsion axis 25, which causes a minute tremor or noise. Referring to FIG. 2, it can be seen that a driving angle of the vertical torsion axis 25 according to a time, i.e. a curve 30, may have a tremor due to a high frequency of about 0.03 degrees.

Such noise may prevent a scanning line from being scanned to a desired location and thus, deteriorate a resolution. Namely, in the case of vertical scanning, horizontal scanning lines may be overlapped due to noise caused by a high frequency, and thus, may not embody a high resolution.

More specifically, when vertically scanning, such noise caused by a high frequency may prevent scanning lines from being scanned in an accurate location. Namely scanning lines may be overlapped with each other or excessively separated from each other. As described above, intervals between horizontal scanning lines may be irregular which may significantly deteriorate a resolution.

Such noise caused by a high frequency tremor described above is a factor to be considered in an actuator requiring a precise location control, such as a scanner. For this reason, a method of constructing a low pass filter as a circuit may be required. However, since electric parts, such as electrical circuitry, may be required, a manufacturing process may be complicated so that productivity is reduced and manufacturing costs are increased.

SUMMARY OF THE INVENTION

Exemplary embodiments of the present invention provide an actuator which has a property of a low pass filter for removing a particular high frequency component from an external input due to its mechanical structure.

Exemplary embodiments of the present invention also provide an actuator which may not need electrical control and additional parts, and can be actuated by an external input, and also is favorable to manufacturing and does not incur an additional cost. This is accomplished by providing a low pass filter having an inventive mechanical design.

Exemplary embodiments of the present invention also provide an actuator which can precisely control a location by effectively eliminating an intervention of a high frequency, and thereby preventing a tremor or noise caused by the high frequency, and when applying the actuator to a scanner, can also prevent a resolution from being deteriorated, which may be caused by overlapping scanning lines, by constantly maintaining a vertical isolation distance between scanning lines.

According to an exemplary aspect of the present invention, an actuator comprises a vibrated body; an external gimbal provided around the vibrated body; a first axis having one end connected to the vibrated body; a second axis being perpendicular to the first axis and externally extended from the external gimbal; and a mechanical filter comprising an internal gimbal formed between the vibrated body and the external gimbal and connected to another end of the first axis and a connection axis connecting the internal gimbal and the external gimbal and formed in an identical direction with the second axis, wherein the vibrated body is excited on the first axis and the second axis by vibrating the external gimbal by an external input, and a vibration of the second axis of the external gimbal travels through the connection axis to the vibrated body.

In this instance, a natural frequency of the vibrated body vibrating on the first axis is larger than a natural frequency of the external gimbal vibrating on the second axis and a natural frequency of the internal gimbal vibrating on the connection axis may be between the natural frequency of the vibrated body and the natural frequency of the external gimbal. The natural frequency of the internal gimbal may be below $1/\sqrt{2}$ of the natural frequency of the vibrated body vibrating on the first axis.

The internal gimbal and the external gimbal may be formed in various shapes. Also, the internal gimbal and the external gimbal may have respectively different shapes. The vibrated body includes a reflective surface to reflect an external light and scan the external light onto an external screen. The external input, a resultant force of two forces, has a high frequency component capable of vibrating the first axis and a low frequency component capable of vibrating the second axis respectively. In this instance, the external input may be provided at an angle with respect to the first axis and the second axis.

According to another exemplary aspect of the present invention, there is provided an actuator comprising a mirror reflecting a light emitted from an outside area; an external gimbal provided around the mirror; a horizontal axis having one end connected to the mirror; a vertical axis being perpendicular to the horizontal axis and externally extended from the external gimbal; and a mechanical filter comprising an internal gimbal formed between the mirror and the external gimbal and connected to another end of the horizontal axis and a connection axis connecting the internal gimbal and the external gimbal and formed in an identical direction with the vertical axis, wherein the mirror is motivated or moved on the vertical axis and the horizontal axis by an external input and a vibration on the horizontal axis vibrates in a higher frequency than a vibration on the vertical axis.

According to another exemplary aspect of the present invention, an actuator is provided comprising a vibrated body; an external gimbal provided around the vibrated body; and a first axis having one end connected to the vibrated body. A second axis is externally extended from the external gimbal, an axial direction of the first axis is transverse to an axial direction of the second axis. A mechanical filter comprising an internal gimbal is formed between the vibrated body and the external gimbal and connected to another end of the first axis, and a connection axis which connects the internal gimbal and the external gimbal. The connection axis may be extended in the same direction as the second axis. The vibrated body is excited by the first axis and the second axis due to a vibration of the external gimbal caused by an external input, such that a vibration of the second axis of the external gimbal travels through the connection axis to the vibrated body.

Another exemplary aspect of the invention provides an actuator system comprising a vibrated body with a reflective surface; an external gimbal provided around the vibrated body; and a first axis having one end connected to the vibrated body. A second axis is externally extended from the external gimbal, such that an axial direction of the first axis is transverse to an axial direction of the second axis. A mechanical filter comprising an internal gimbal is formed between the vibrated body and the external gimbal and connected to another end of the first axis, and a connection axis which connects the internal gimbal and the external gimbal. The connection axis may extend in the same direction as the second axis. The vibrated body is excited by the first axis and the second axis due to a vibration of the external gimbal caused by an external input, such that a vibration of the second axis of the external gimbal travels through the connection axis to the vibrated body. Also provided is at least one modulator and at least one laser modulated by the at least one modulator to provide light, wherein the reflective surface of the vibrated body reflects the light. The actuator system may also comprise an external screen, wherein the vibrated body scans the light on the external screen.

According to anther exemplary aspect of the invention, a method of vibrating a body is contemplated, comprising providing a body to be vibrated on a first axis; disposing an external gimbal around the body, the external gimbal having an externally extending second axis; and providing an external input which vibrates the external gimbal. The method also comprises mechanically filtering a vibration with an internal gimbal formed between the body and the external gimbal, the internal gimbal being coupled with the external gimbal by a connection axis and coupled with the internal gimbal by the first axis; and exciting the body by a vibration on the first axis and a vibration on the second axis, such that the vibration on the second axis travels through the connection axis to the body.

BRIEF DESCRIPTION OF THE DRAWINGS

The above aspects will become apparent and more readily appreciated from the following detailed description, taken in conjunction with the accompanying drawings of which.

DETAILED DESCRIPTION OF THE EXEMPLARY EMBODIMENTS

Reference will now be made in detail to exemplary embodiments of the present invention, examples of which are illustrated in the accompanying drawings, wherein like reference numerals refer to the like elements throughout. The embodiments are described below in order to explain the present invention by referring to the figures.

In an exemplary embodiment of the present invention, a scanner is utilized as an example of an actuator. However, the present invention is not limited thereto, and it will be apparent that the exemplary embodiments of the present invention may be widely applicable to any type of actuator which can be driven by an external input.

Figure 3:
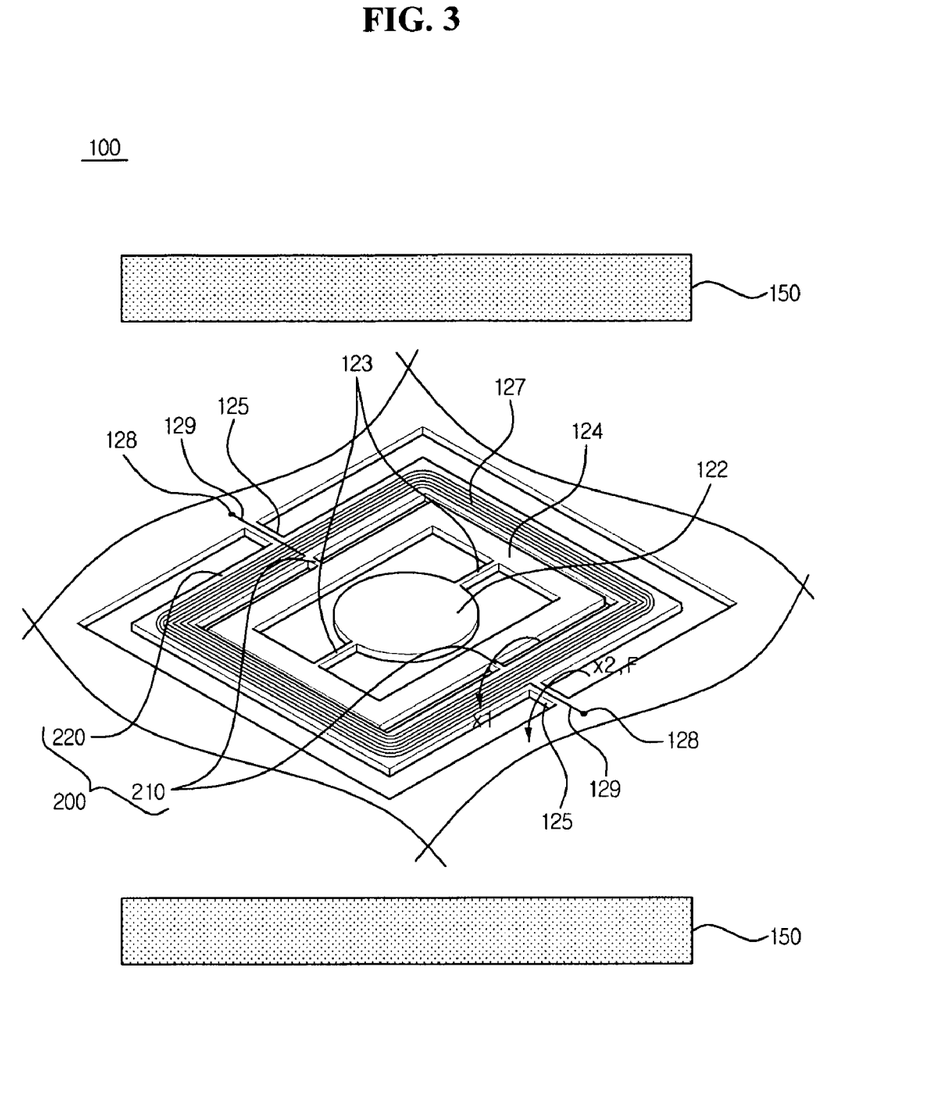
FIG. 3 is a perspective view illustrating a scanner according to an exemplary embodiment of the present invention.

FIG. 3 is a perspective view illustrating a scanner according to an exemplary embodiment of the present invention. As shown in FIG. 3, a scanner 100 includes a mirror 122, which reflects light from its center. A horizontal axis 123 is extended from the mirror 122 at opposite ends of the mirror 122. An internal gimbal 124 is physically connected to the horizontal axis 123 and is provided around the mirror 122.

A connection axis 210 is extended from the internal gimbal 124 in a direction transverse or perpendicular to the horizontal axis 123 and connected to an external gimbal 220. In this instance, the external gimbal 220 is connected to a vertical axis 125 and extends in the same plane as the vertical axis 125.

A driving coil 127 is coiled on a front surface of the external gimbal 220 in a circular direction. The driving coil 127 and a magnetic field which is generated by a magnet 150 interact, and thereby enable the mirror 122 to vibrate. The magnet 150 may be a permanent magnet. The driving coil 127 is connected to electrode 128 by connection line 129.

The magnet 150 is provided around the external gimgal 220. The magnet 150 includes two magnets, and the two magnets 150 are arranged on opposite sides of the external gimgal 220. Also, the magnet 150 generates a magnetic field. The magnetic field interacts with the driving coil 127, and thereby causes the mirror 122, the internal gimbal 124, and the external gimbal 220 to vibrate.

When a moment is applied to the external gimbal 220 in a direction between the horizontal axis 123 and the vertical axis 125, the moment is distributed into two directions, i.e. a direction along the horizontal axis 123 and a direction along the vertical axis 125, and thereby drives the external gimbal 220. In this instance, the moment has two different frequency components synthesized for vertically and horizontally driving the mirror 122. Also, driving on the vertical axis 125 of the external gimbal 220 is transmitted to the mirror 122 via the connection axis 210, and driving of the external gimbal 220 on the horizontal axis 123 is transmitted to the internal gimbal 124 and the mirror 122.

Namely, a vibration of the horizontal axis 123 horizontally scans a scanning line onto a screen and a vibration of the vertical axis 125 vibrates the internal gimbal 124 via the connection axis 210 whereby scanning lines may be vertically moved on the screen and a two-dimensional image may be embodied.

As described above, each moment for horizontally and vertically vibrating the mirror 122 may be provided to the external gimbal 220 as one synthesized moment. In this instance, such a synthesized moment has a sawtooth wave form of an approximate low frequency in which a high frequency signal is modulated onto a low frequency signal, such that the high frequency signal is merged with the low frequency signal. A vertical axial behavior of the external gimbal 220 by a synthesized moment F has two frequency components. In this instance, since a high frequency component is filtered via the connection axis 210 only a remaining low frequency component is transmitted to the mirror 122, and thus, a high resolution may be embodied.

Figure 4:
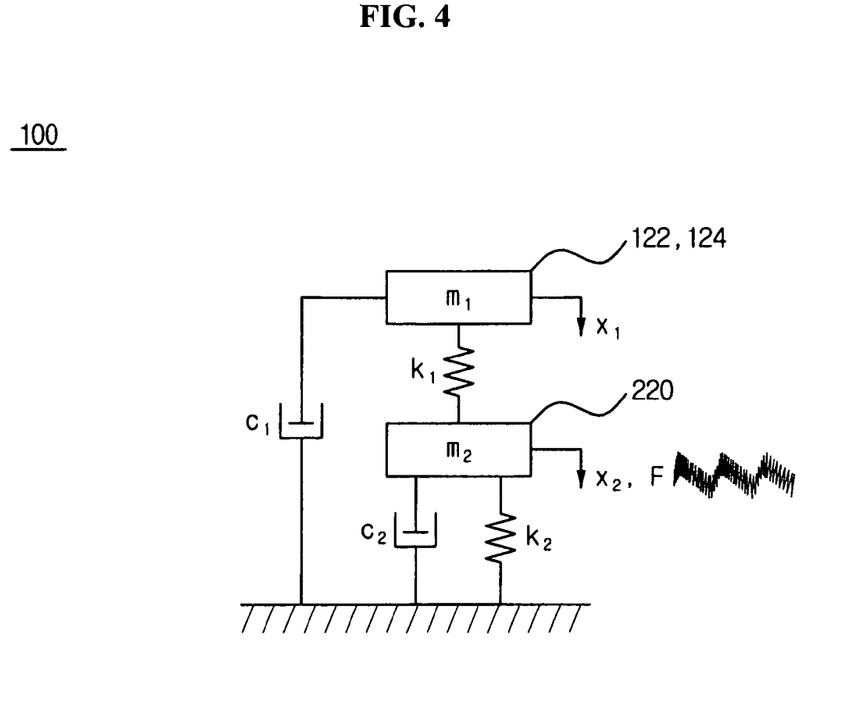
FIG. 4 is a configuration diagram modeling the present invention.

FIG. 4 is a configuration diagram modeling a vertical axial behavior according to an exemplary embodiment of the present invention.

As shown in FIG. 4, the scanner 100 of an exemplary embodiment of the present invention may be modeled with a spring-mass-damper system. In this instance, m1 denotes a moment of inertia of the internal gimbal 124 and the mirror 122, k1 denotes a rigidity coefficient of the connection axis 210, c1 denotes a damping coefficient, m2 denotes a moment of inertia of the external gimbal 220, k2 denotes a rigidity coefficient of the vertical axis 125 and c2 denotes a damping coefficient. In this case, the scanner 100 may be modeled by, $$m_1 \cdot d^2x_1/dt^2 + c_1 \cdot dx_1/dt + (x_1-x_2)k_1 = 0$$

$$m_2 \cdot d^2x_2/dt^2 + c_2 \cdot dx_2/dt + (k_1+k_2)x_2 - k_1x_1 = F \quad \text{[Equation 1]}$$

Figure 5:
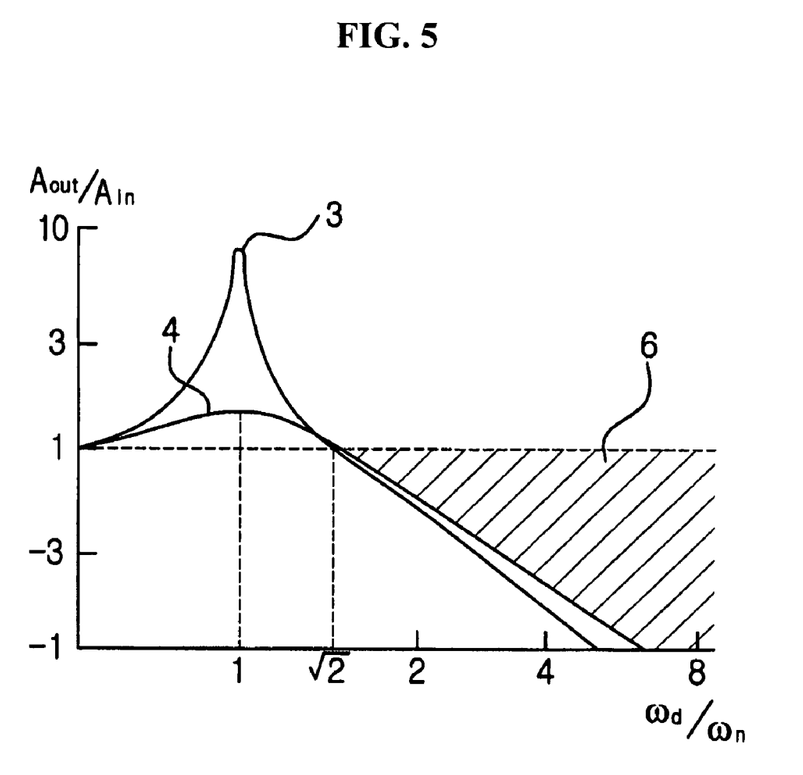
FIG. 5 is a graph illustrating a transmittance according to a frequency ratio.

To observe the movement of the mirror 122 and the internal gimbal 124, $w_n$ denotes a natural frequency of the mirror 122 and the internal gimbal 124. In this instance, $w_n$ is a natural frequency when the mirror 122 and the internal gimbal 124 vibrate on the connection axis 210. In the modeled system of FIG. 4, a vibration of $m_2$ by the external input F generates a low frequency component in the form of a sawtooth wave and a high frequency component in the form of a sine wave. In this instance, a vibration $x_1$ of $m_1$ is determined by a vibration of $m_2$. FIG. 5 generally shows the spring-mass-damper system of FIG. 4 when a vibration having a size $A_{in}$ and a frequency $w_d$ is supplied to a base, and response properties of the springmass-damper system connected to the base are known. In this instance, a frequency ratio and a transmittance are defined by, $$\text{Frequency ratio} = w_d/w_n \quad \text{[Equation 2]}$$

$$\text{Transmittance} = A_{out}/A_{in} \quad \text{[Equation 3]}$$

In this instance, Aout indicates an amplitude with respect to a vibration of a mass by a vibration of the base. The relation between the frequency ratio and the transmittance is shown in FIG. 5. In FIG. 5, the x axis indicates the frequency ratio and the y axis indicates the transmittance in a log scale.

As shown in FIG. 5, the transmittance shows the largest amplitude when an external input that is identical to a natural frequency is input, i.e. where the x axis is 1. Also, when a vibration having a significantly lower frequency than a natural frequency is input, the transmittance is nearer to 1. Also, the transmittance enters a buffer zone 6 where the frequency ratio is above $\sqrt{2}$. In this instance, the buffer zone 6 indicates an area where the transmittance is below 1, in which $A_{out}$ becomes less than $A_{in}$. A curve 3 indicates a property curve with a low damping coefficient, such as a rubber and silicon, used to form a filter. A curve 4 indicates a property curve with high damping coefficient. Namely, when the frequency ratio is more than $\sqrt{2}$ regardless of the damping coefficient value, the transmittance enters the buffer zone 6 where a high frequency component may be filtered. In other words, to make a system less affected by a high frequency vibration which is transmitted from an outside, a natural frequency of the system may be designed to be below $1/\sqrt{2}$ with respect to the high frequency that is transmitted from the outside.

Figure 6:
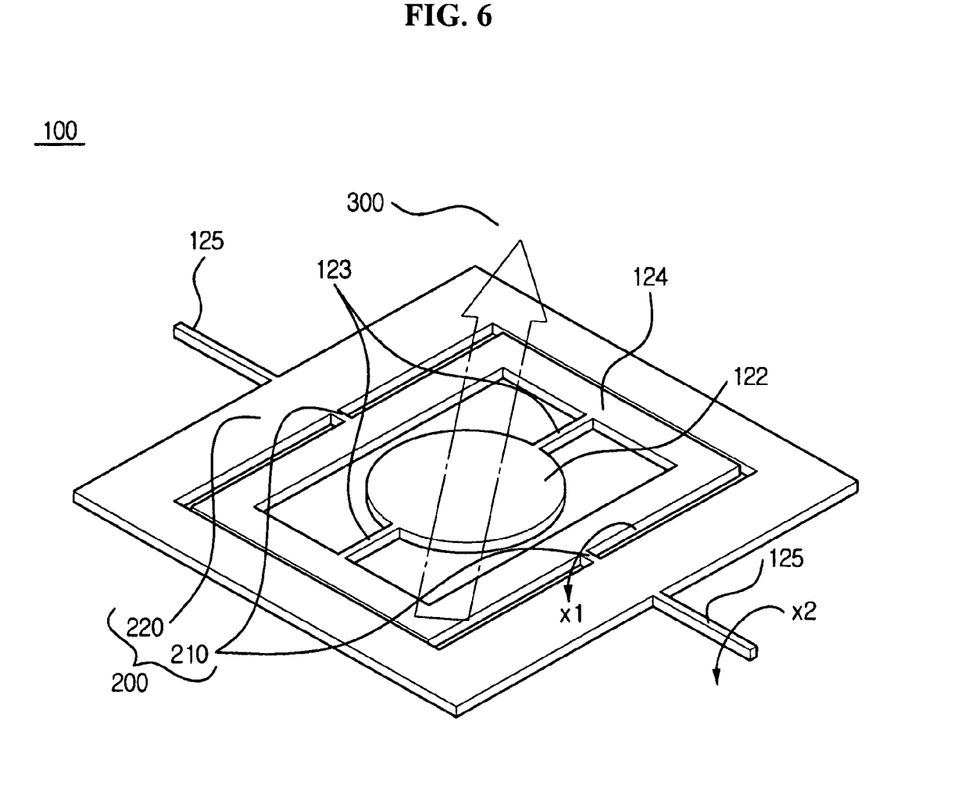
FIG. 6 is a perspective view illustrating a synthesized moment working on a scanner according to an exemplary embodiment of the present invention.
Figure 7A:
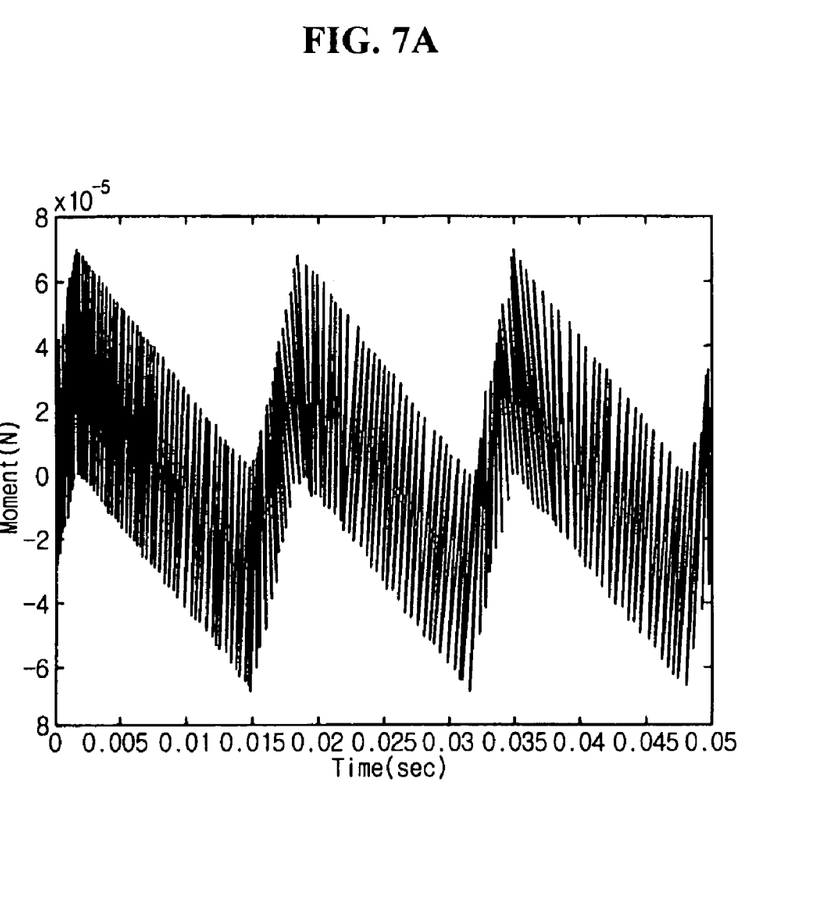
FIG. 7A is a graph illustrating a synthesized moment with respect to time.
Figure 7B:
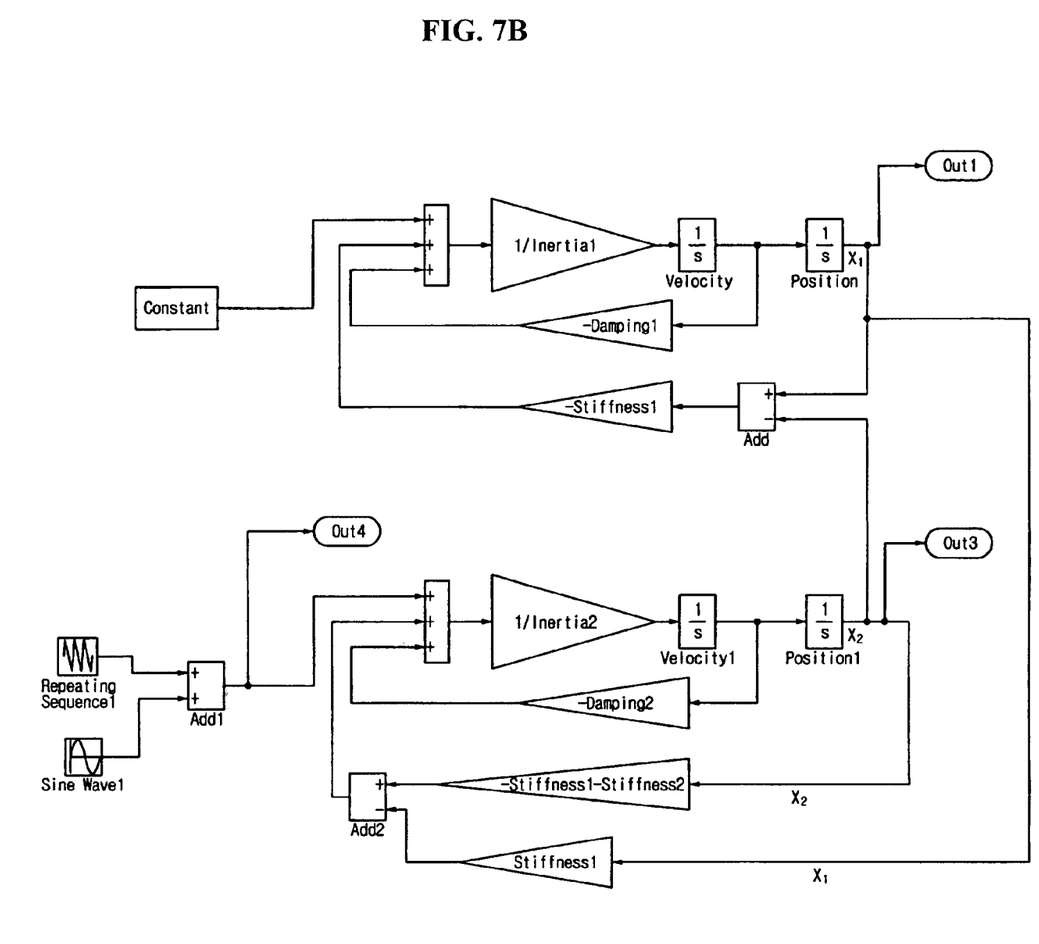
FIG. 7B is a configuration diagram for simulating a scanner according to an exemplary embodiment of the present invention.
Figure 7C:
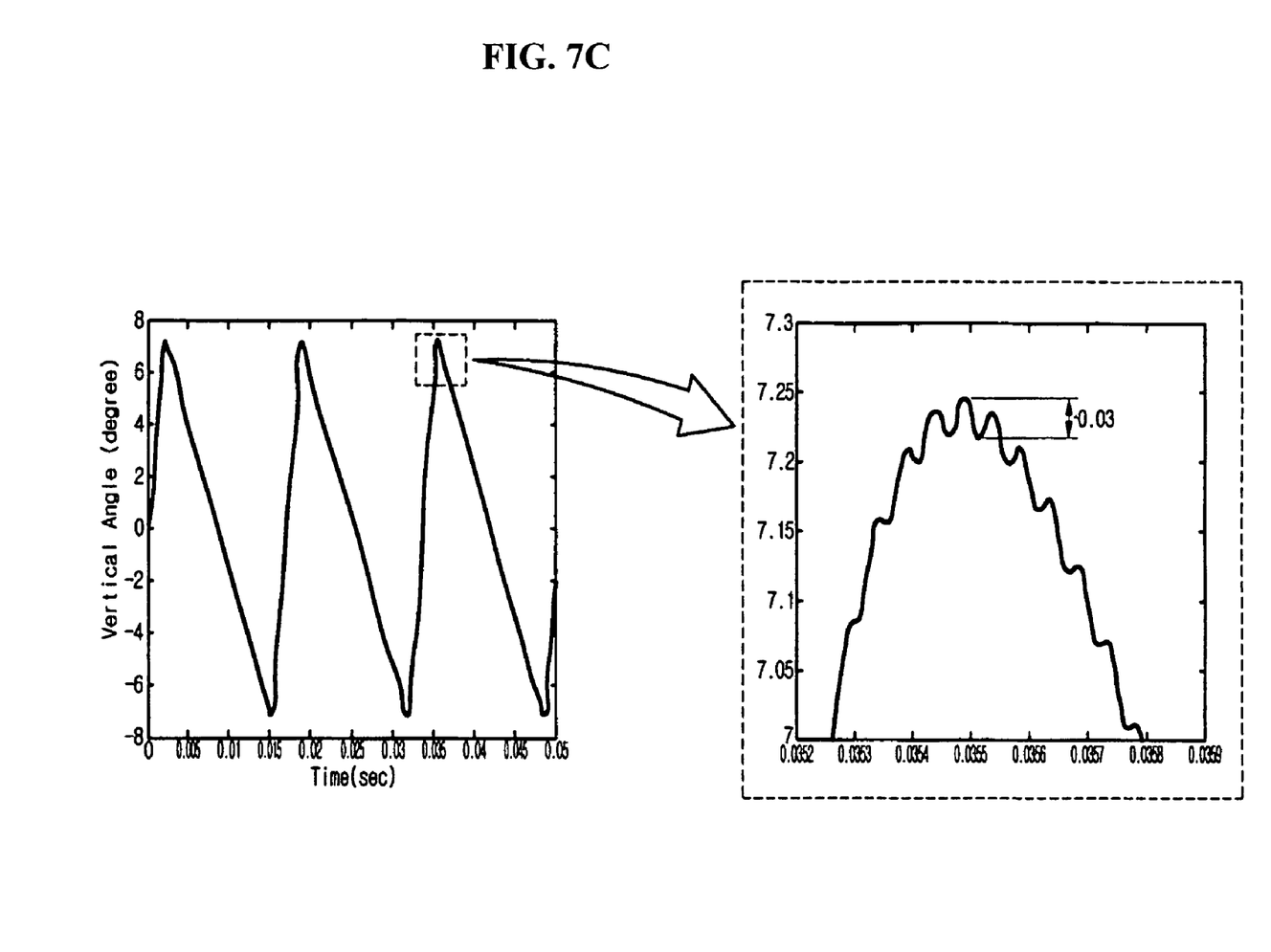
FIG. 7C illustrates a displacement of $x_2$ with respect to time.
Figure 7D:
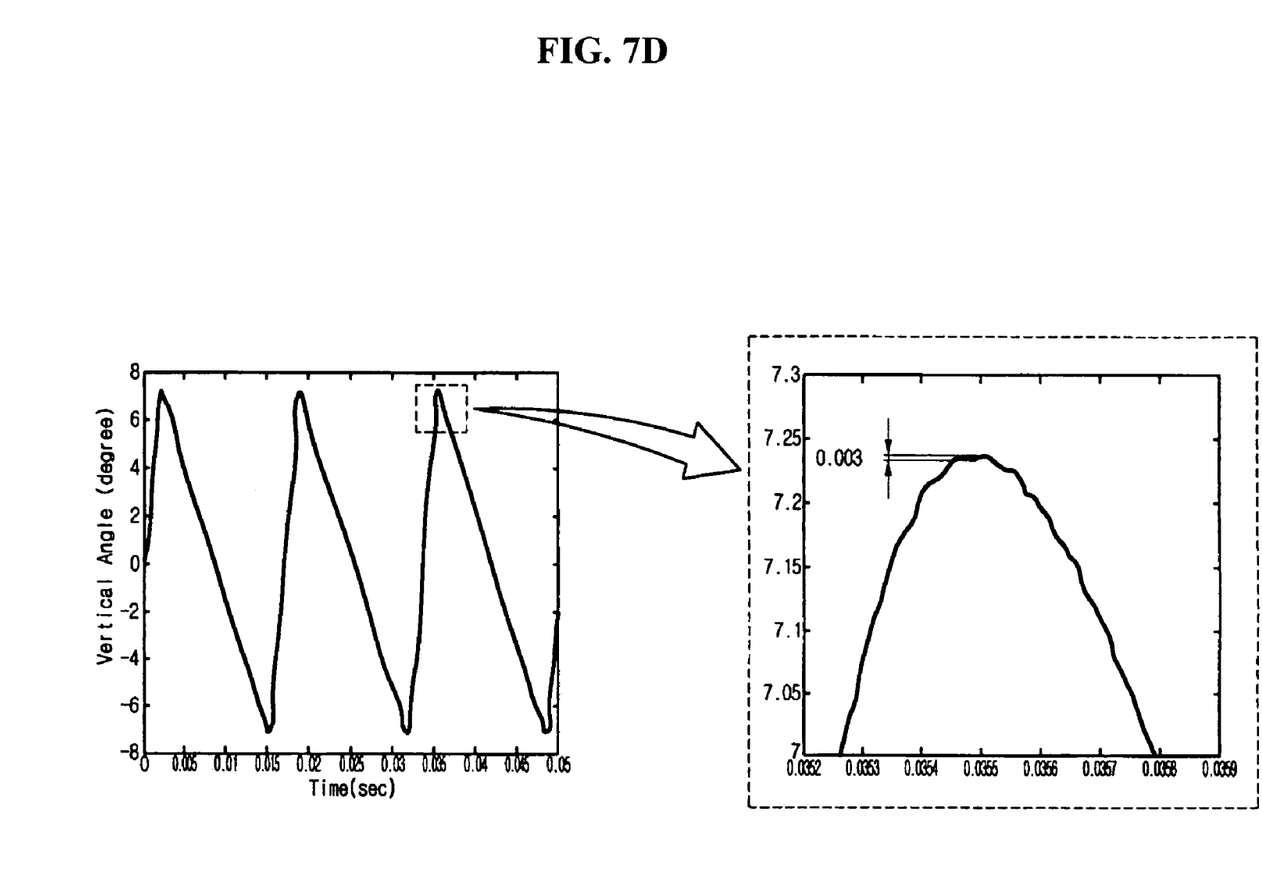
FIG. 7D illustrates a displacement of $x_1$ with respect to time.

An operation and effect of an exemplary embodiment of the present invention will be described. FIG. 6 is a perspective view illustrating a synthesized moment 300 working on a scanner 100 according to an exemplary embodiment; FIG. 7A is a graph illustrating a synthesized moment 300 with respect to time; FIG. 7B is a configuration diagram of a MATLAB SIMULINK model simulation of an exemplary system modeled as Equation 1 for simulating a scanner 100 according to an exemplary embodiment; FIG. 7C illustrates a displacement of $x_2$ with respect to time; and FIG. 7D illustrates a displacement of $x_1$ with respect to time.

As shown in FIGS. 6 and 7A through 7D, a synthesized moment 300 is applied to an external gimbal 220. As described above, the synthesized moment 300 is generated by synthesizing and modulating a vertical drive signal and a horizontal drive signal. The synthesized moment 300 is applied at an angle between a horizontal axis 123 and a vertical axis 125. With assumptions that a vertical drive signal is approximately 60 Hz and a high frequency signal is approximately 20 kHz, the synthesized moment 300 thereof is shown in FIG. 7A.

In this instance, it is assumed that the external gimbal 220 is designed to vibrate on the vertical axis 125 when a resonant frequency is about 1 kHz and the mirror 122 is designed to vibrate on the horizontal axis 123 when a resonant frequency is about 20 kHz. Under these conditions, when the synthesized moment 300 is applied to the external gimbal 220, the synthesized moment 300 may be divided into two components to vertically and horizontally vibrate the external gimbal 220. Namely, since a vibration of the external gimbal 220 on the horizontal axis 123 includes both components, i.e. 60 Hz and 20 kHz, and is also identical to a resonant frequency, about 20 kHz, of the mirror 122, a transmittance may be significantly increased. The mirror 122 is oscillated to provide a large displacement on the horizontal axis 123, and is vibrated in a sine wave form.

The synthesized moment 300 also vibrates the external gimbal 220 on the vertical axis 125. In this instance, the synthesized moment 300 includes both components, i.e. 60 Hz and 20 kHz. Accordingly, since the external gimbal 220 is designed to have a resonant frequency of about 1 kHz, a vibration component of about 20 kHz weakly exists and a component of about 60 Hz is mainly vibrated in a sawtooth wave form.

In this instance, as shown in FIG. 7C, a displacement $x_2$ of the external gimbal 220 is shown in a sawtooth wave form, but a high frequency vibration is also minutely generated by a high frequency moment. However, when a resonant frequency of the internal gimbal 124 and the mirror 122 vibrating on the connection axis 210 is designed to be about 8 kHz below about 20 kHz, it can be seen in the simulation shown in FIG. 7D that a high frequency component is almost completely filtered in movement of the internal gimbal 124 and the mirror 122, and noise of the internal gimbal 124 and the mirror 122 is significantly reduced by about 1/10. This is because a vibration component, at about 20 kHz, of the external gimbal 220 is barely transmitted to the internal gimbal 124 and the mirror 122 having a resonant frequency of about 8 kHz. Namely, since a mechanical structure between the internal gimbal 124 and the connection axis 210 functions as a low pass filter, the mirror 122 may be prevented from vibrating due to vibrations on the vertical axis 125 in a high frequency. Accordingly, a vertical isolation distance between horizontal scanning lines may be constant and not overlap the scanning lines, and a resolution may be improved.

Figure 8:
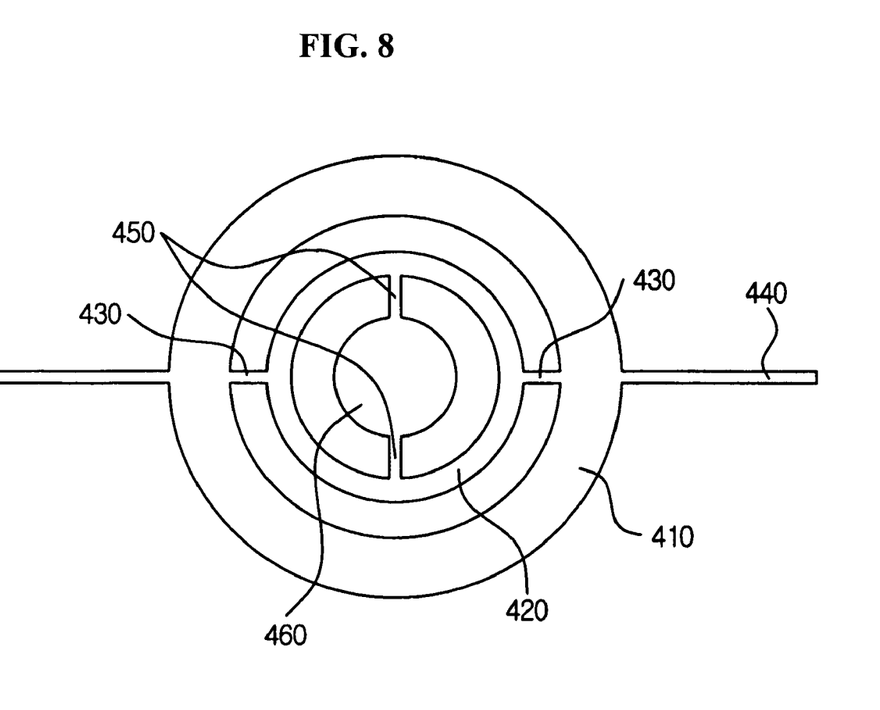
FIG. 8 is a top view illustrating an exemplary modification according to an embodiment of the present invention.

FIG. 8 is a top view illustrating a modified exemplary embodiment according to the present invention. As shown in FIG. 8, an external gimbal 410 and an internal gimbal 420 are in a form of a donut. Similar to the previous embodiment, a mirror 460 is provided in the internal gimbal 420 and is connected to the internal gimbal 420 via a horizontal axis 450. The internal gimbal 420 is connected to a connection axis 430 which maintains a transverse or perpendicular relationship with the horizontal axis 450. Also, a vertical axis 440 is formed on an identical or similar axis as the connection axis 430 and is externally extended from the external gimbal 410. In the present exemplary embodiment, it is described that the connection axis 430 and the vertical axis 440 are provided on an identical or similar axis, but the exemplary embodiments of the present invention are not limited thereto. It may be sufficient if the connection axis 430 and the vertical axis 440 are provided in an identical or similar direction. Also, the internal gimbal 420 and the external gimbal 410 of a scanner may be formed in various shapes. In this instance, the internal gimbal 420 and the external gimbal 410 may also have respectively different shapes.

Figure 9:
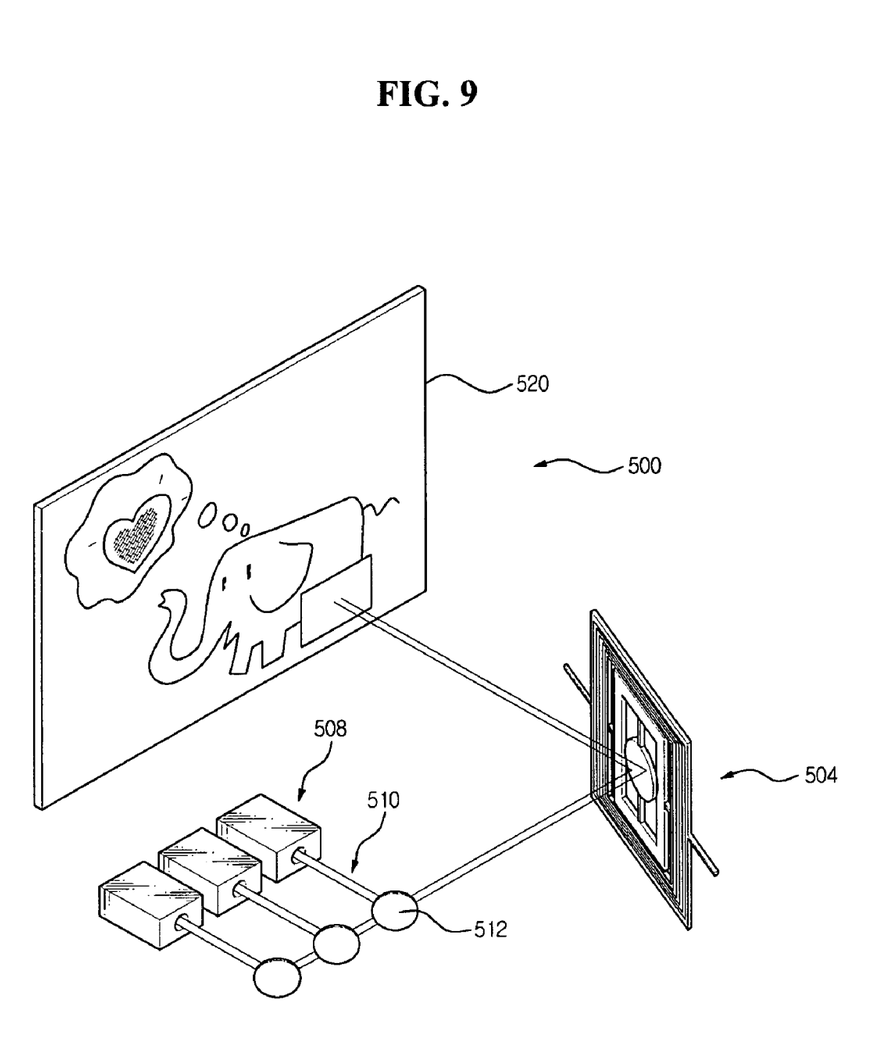
FIG. 9 is a perspective view illustrating a scanner corresponding to an exemplary embodiment.

An actuator system 500 according to an exemplary embodiment is illustrated in FIG. 9. The system comprises an actuator 504, such as those described above with reference to FIGS. 3, 6 and 8. Compact lasers with modulators 508 are operative to provide RGB light 510 to micro-optic devices 512. The light is combined by the micro-optic devices 512 and directed to the actuator 504. The actuator 504 is operated in the manner discussed above with regard to the exemplary embodiments, such that light 510 is scanned on a screen 520.

As a modified embodiment of the present invention, a plurality of connection axes may be provided. Namely, an even or odd number of connection axes may be symmetrically provided with respect to an externally extended vertical axis. Also, a plurality of vertical axes may be provided. The plurality of vertical axes may also be symmetrically provided with respect to a connection axis. Also, a plurality of vertical axes and a plurality of connection axes may be provided.

According to the exemplary embodiments of the present invention, there is provided an actuator which has a property of a low pass filter for removing a particular high frequency component from an external input due to its mechanical structure.

Also, according to the present invention, there is provided an actuator which does not need an electrical control or an additional part, and can be actuated by an external input, and also is favorable to manufacturing and does not incur an additional cost by providing a low pass filter. These aspects may be accomplished by the presently disclosed examples of change in mechanical design.

Also, according to the exemplary embodiments of the present invention, there is provided an actuator which can precisely control a location by effectively eliminating an intervention of a high frequency and thereby preventing a tremor or noise caused by the high frequency, and constantly maintain a vertical isolation distance between scanning lines. Accordingly, when applying the actuator to a scanner, resolution may not be deteriorated, which otherwise may be caused by overlapping scanning lines.

Although a few exemplary embodiments of the present invention have been shown and described, the present invention is not limited to the described embodiments. Instead, it will be appreciated by those skilled in the art that changes may be made to these exemplary embodiments without departing from the principles and spirit of the invention, the scope of which is defined by the claims and their equivalents.

What is claimed is:

1. An actuator comprising:
a vibrated body;
an external gimbal provided around the vibrated body;
a first axis having one end connected to the vibrated body;
a second axis externally extended from the external gimbal, such that an axial direction of the first axis is transverse to an axial direction of the second axis; and
a mechanical filter comprising an internal gimbal formed between the vibrated body and the external gimbal and connected to another end of the first axis, and a connection axis which connects the internal gimbal and the external gimbal, the connection axis being extended in a same direction as the second axis,
wherein the vibrated body is excited by the first axis and the second axis due to a vibration of the external gimbal caused by an external input, such that a vibration of the second axis of the external gimbal travels through the connection axis to the vibrated body.

2. The actuator of claim 1, wherein a natural frequency of the vibrated body vibrating on the first axis is larger than a natural frequency of the external gimbal vibrating on the second axis.

3. The actuator of claim 2, wherein a natural frequency of the internal gimbal is below $1/\sqrt{2}$ a frequency filtered from a frequency of the external input which vibrates the external gimbal on the second axis.

4. The actuator of claim 1, wherein at least two connection axes are provided.

5. The actuator of claim 4, wherein the at least two connection axes are provided in a direction along the second axis and are symmetrical to each other.

6. The actuator of claim 1, wherein at least two second axes are provided.

7. The actuator of claim 6, wherein at least two first axes are provided.

8. The actuator of claim 1, wherein the vibrated body comprises a reflective surface to reflect an external light and scan the external light onto an external screen.

9. The actuator of claim 1, wherein the external input is a resultant force of two forces having a high frequency which oscillates the vibrated body on the first axis and a low frequency which vibrates the external gimbal on the second axis respectively.

10. The actuator of claim 1, wherein the connection axis and the second axis are aligned with each other.

11. An actuator comprising:
a mirror which reflects light emitted from an outside area;
an external gimbal provided around the mirror;
a horizontal axis having one end connected to the mirror;
a vertical axis externally extended from the external gimbal, such that an axial direction of the vertical axis is transverse to an axial direction of the horizontal axis; and
a mechanical filter comprising an internal gimbal formed between the mirror and the external gimbal and connected to another end of the horizontal axis, and a connection axis which connects the internal gimbal and the external gimbal, the connection axis extended in a same direction as the vertical axis,
wherein the mirror is motivated by the vertical axis and the horizontal axis due to an external input, and a vibration on the horizontal axis vibrates in a higher frequency than a vibration on the vertical axis.

12. The actuator of claim 11, wherein a natural frequency of the mirror vibrating on the horizontal axis is higher than a natural frequency of the external gimbal vibrating on the vertical axis.

13. The actuator of claim 11, wherein a natural frequency of the internal gimbal is below $1/\sqrt{2}$ a frequency filtered from a frequency of the external input which vibrates the external gimbal on the vertical axis.

14. The actuator of claim 11, wherein at least two connection axes are provided.

15. The actuator of claim 14, wherein the at least two connection axes are provided in a direction along the vertical axis and are symmetrical to each other.

16. The actuator of claim 11, wherein at least two vertical axes are provided.

17. The actuator of claim 16, wherein at least two horizontal axes are provided.

18. The actuator of claim 11, wherein the external input is a resultant force of two forces having a high frequency for oscillating the mirror on the horizontal axis and a low frequency for vibrating the external gimbal on the vertical axis respectively.

19. The actuator of claim 11, wherein the vertical axis and the connection axis are aligned with each other.

20. An actuator system comprising:
an actuator comprising,
a vibrated body with a reflective surface;
an external gimbal provided around the vibrated body;
a first axis having one end connected to the vibrated body;
a second axis externally extended from the external gimbal, such that an axial direction of the first axis is transverse to an axial direction of the second axis; and
a mechanical filter comprising an internal gimbal formed between the vibrated body and the external gimbal and connected to another end of the first axis, and a connection axis which connects the internal gimbal and the external gimbal, the connection axis being extended in a same direction as the second axis,
wherein the vibrated body is excited by the first axis and the second axis due to a vibration of the external gimbal caused by an external input, such that a vibration of the second axis of the external gimbal travels through the connection axis to the vibrated body;
at least one modulator;
at least one laser which is modulated by the at least one modulator to provide light, wherein the reflective surface of the vibrated body reflects the light.

21. The actuator system of claim 20, further comprising an external screen, wherein the vibrated body scans the light on the external screen.

22. The actuator of claim 20, wherein a natural frequency of the vibrated body vibrating on the first axis is larger than a natural frequency of the external gimbal vibrating on the second axis.

23. The actuator of claim 22, wherein a natural frequency of the internal gimbal is below $1/\sqrt{2}$ a frequency filtered from a frequency of the external input which vibrates the external gimbal on the second axis.

24. The actuator of claim 20, wherein at least two connection axes are provided.

25. The actuator of claim 24, wherein the at least two connection axes are provided in a direction along the second axis and are symmetrical to each other.

26. The actuator of claim 20, wherein at least two second axes are provided.

27. The actuator of claim 26, wherein at least two first axes are provided.

28. The actuator of claim 20, wherein the external input is a resultant force of two forces having a high frequency which oscillates the vibrated body on the first axis and a low frequency which vibrates the external gimbal on the second axis respectively.

29. The actuator of claim 20, wherein the connection axis and the second axis are aligned with each other.

30. A method of vibrating a body, the method comprising:
   providing a body to be vibrated on a first axis;
   disposing an external gimbal around the body, the external gimbal having an externally extending second axis;
   providing an external input which vibrates the external gimbal;
   mechanically filtering a vibration with an internal gimbal formed between the body and the external gimbal, the internal gimbal being coupled with the external gimbal by a connection axis and coupled with the internal gimbal by the first axis;
   exciting the body by a vibration on the first axis and a vibration on the second axis, such that the vibration on the second axis travels through the connection axis to the body.

31. The method of vibrating a body of claim 30, further comprising providing the body with a reflective surface.

32. The method of vibrating a body of claim 30, further comprising providing a natural frequency of the body to be larger than a natural frequency of the external gimbal.

33. The method of vibrating a body of claim 30, further comprising providing a natural frequency of the internal gimbal to be below $1/\sqrt{2}$ a frequency filtered from a frequency of the external input which vibrates the external gimbal.

34. The method of vibrating a body of claim 30, wherein at least two connection axes are provided and are aligned with the second axis.

35. The method of vibrating a body of claim 31, wherein the reflective surface reflects an external light and scans the external light onto an external screen.

36. The method of vibrating a body of claim 30, wherein the external input is a resultant force of two forces having a high frequency which oscillates the body on the first axis and a low frequency which vibrates the external gimbal on the second axis respectively.

* * * * *